United States Patent [19]

Stewart et al.

[11] Patent Number: 5,057,194
[45] Date of Patent: Oct. 15, 1991

[54] SALT-BASED MELTING PROCESS

[75] Inventors: Donald L. Stewart, Greensburg; Jan H. L. Van Linden, Allison Park; Alfred F. LaCamera, Trafford; Thomas V. Pierce, Delmont; James O. Parkhill, Tarentum; John M. Urbanic, Pittsburgh; Thomas R. Hornack, Lower Burrell, all of Pa.

[73] Assignee: Aluminum Company of America, Pittsburgh, Pa.

[21] Appl. No.: 435,502

[22] PCT Filed: Jul. 19, 1988

[86] PCT No.: PCT/US88/02374
§ 371 Date: Oct. 13, 1989
§ 102(e) Date: Oct. 13, 1989

[87] PCT Pub. No.: WO89/06291
PCT Pub. Date: Jul. 13, 1989

Related U.S. Application Data

[63] Continuation-in-part of Ser. No. 40,132, Apr. 20, 1987, Pat. No. 4,761,207, and a continuation-in-part of Ser. No. 40,133, Apr. 20, 1987, Pat. No. 4,758,316, and a continuation-in-part of Ser. No. 138,391, Dec. 28, 1987, abandoned, and a continuation-in-part of Ser. No. 197,889, May 24, 1988, abandoned.

[51] Int. Cl.$^5$ ............................................. C25C 3/06
[52] U.S. Cl. ...................................... 204/67; 204/68; 75/10.54; 75/10.65
[58] Field of Search ..................... 204/67, 68; 75/68 R

[56] References Cited

U.S. PATENT DOCUMENTS

| | | | |
|---|---|---|---|
| 3,955,970 | 5/1976 | Claxton et al. | 75/68 R |
| 4,209,496 | 6/1980 | Carpenter et al. | 423/210 |
| 4,440,610 | 4/1984 | Dawless et al. | 204/67 |
| 4,465,659 | 8/1984 | Cambridge et al. | 204/67 |
| 4,533,442 | 8/1985 | Neelameggham et al. | 204/68 |
| 4,568,430 | 2/1986 | Vire | 204/67 |
| 4,576,690 | 3/1986 | Fields et al. | 204/67 |
| 4,758,316 | 7/1988 | Stewart, Jr. et al. | 204/67 |
| 4,761,207 | 8/1988 | Stewart, Jr. et al. | 204/67 |

Primary Examiner—John F. Niebling
Assistant Examiner—Steven P. Marquis
Attorney, Agent, or Firm—Daniel A. Sullivan, Jr.; Douglas P. Mueller

[57] ABSTRACT

A continuous salt-based process is provided for melting and reclaiming aluminum from aluminum scrap containing impurities including heating a molten salt in a heat bay, mixing the heated salt with aluminum scrap or skim in a charge bay to form a molten charge mixture, separating aluminum from impurities in the charge bay by coalescing aluminum to form a molten aluminum metal pad, chlorinating a portion of the charge mixture from the charge bay to form a chlorinated salt mixture and metal chlorides, removing metal chlorides from the salt mixture, and feeding the salt mixture back to the heat bay. In one aspect, the chlorinating step of the present invention includes introducing carbon monoxide or, preferably, solid carbon to control oxide concentration. The process further comprises adding fluorides and removing metal chlorides from the salt to maintain a preferred salt composition. The metal chlorides can be removed by withdrawing volatile metal chloride gases and electrolytically reducing metal chlorides in the molten salt. A further aspect of the invention permits direct reduction of oxide impurities in the salt by electrolysis. In another aspect of the invention, the scrap itself is used as a consumable heating electrode (i.e., disappearing as the scrap melts) for heating the molten salt. An additional aspect of the invention provides that the molten salt is pumped past heating electrodes, which reduces hot spots that otherwise would lead to fuming and cause instability in the molten bath composition. Yet another aspect of the invention permits removal of carbon impurities, which can be introduced to the molten salt when melting of the scrap causes pyrolysis of organic material associated with the scrap, for example, the lacquer coating on beverage cans.

17 Claims, 6 Drawing Sheets

FIG. 2. CLEANING LOOP

SALT-BASED MELTING PROCESS

CROSS-REFERENCE TO RELATED APPLICATIONS

This application is a continuation-in-part of Ser. No. 040,132 filed Apr. 20, 1987 (U.S. Pat. No. 4,761,207) Ser. No. 040,133 filed Apr. 20, 1987 (U.S. Pat. No. 4,758,316), Ser. No. 139,391 filed Dec. 28, 1987 (now abandoned) and Ser. No. 197,889 filed May 24, 1988 (now abandoned). su

BACKGROUND OF THE INVENTION

This invention relates to a recycling process for recovering or reclaiming light metal (magnesium, aluminum and their alloys), for instance recovering aluminum metal, from aluminum containing impurities, for instance recovering aluminum metal from aluminum scrap or aluminum skim, i.e., dross. This invention similarly is applicable to recovering alloys such as aluminum-lithium alloys which contain impurities, e.g., aluminum-lithium scrap or aluminum lithium skim or dross.

Aluminum metal is an engineering material which can be readily recycled. Aluminum recycling involves the recovery or reclamation of aluminum metal from aluminum scrap containing impurities, e.g., such as aluminum scrap from used beverage cans or aluminum skim or dross from processes wherein molten aluminum metal comes into contact with oxygen in the air. Typically, the impurities in the aluminum scrap or skim exist as oxides and include aluminum oxide on the surface of the aluminum and other oxides such as surface magnesium oxide deriving from alloying elements. Aluminum skim often contains nitrides such as A1N and carbides such as A1C. Other extraneous materials commonly present in used beverage can scrap are silicon dioxide from dirt or titanium dioxide from pigment in the surface coatings on the used beverage cans. Other extraneous materials in alloys such as aluminum lithium alloys would include surface oxides containing lithium aluminate and oxides of aluminum lithium and magnesium.

Molten salt reclamation processes involve lifting non-metallic materials from aluminum or aluminum alloys during melting and preferentially wetting the non-metallic materials comprising the impurities in the incoming aluminum scrap. The molten salt preferentially wets the impurities which separate from the aluminum as the aluminum coalesces into metal droplets. The aluminum metal droplets sink to the bottom of a salt-containing process vessel and form into a continuous molten metal pad of aluminum.

The preferential wetting of the oxides and the resulting separation of aluminum from such contaminant oxides is a function of salt composition and the amount of solid particulate oxides and nitride present in the salt. As scrap is fed to the salt-containing process vessel, the amount of oxides present in the salt increases with each increment of scrap added to the process. This increasing oxide content poses a serious problem in salt-based reclamation processes since the presence of oxides at levels higher than 5 to 30 wt %, as a function of particle size distribution, causes significant reductions in the recovery of aluminum from the process. In effect, the high oxide levels poison the process for reclaiming aluminum metal. This aspect of the conventional process has been a significant drawback in the efficiency and economics of salt-based recovery systems.

It is an object of the present invention to provide a process for reclaiming aluminum metal or alloys from aluminum scrap or skim containing impurities, or aluminum alloy, e.g., aluminum-lithium, scrap or skim.

It is a further object of the present invention to provide a process for reclaiming aluminum metal or alloy from scrap or skim containing impurities at a higher yield than in present processes.

It is yet another object of the present invention to provide a process for melting aluminum metal or alloy while preventing contamination of the melt to an extent that is not now practicable.

These and other objects of the present invention will become apparent from the description of the invention as follows.

DISCLOSURE OF THE INVENTION

The process of the present invention for continuous saltbased melting and purifying of aluminum or alloys thereof such as aluminum-lithium includes heating a molten salt in a heat bay, the heating being preferably AC electrical resistance heating with salt circulation to reduce and even prevent hot spots, mixing the heated salt with aluminum scrap or skim in a charge bay to form a molten charge mixture, separating aluminum metal from impurities by coalescing to form a molten metal pad of aluminum and a salt sludge containing separated impurities chlorinating a portion of the salt sludge to form a chlorinated salt mixture containing metal chlorides, removing lithium in the case of aluminum-lithium alloys, removing metal chlorides from the chlorinated salt mixture, and feeding the remaining chlorinated salt mixture back to the heat bay. The process chlorinating step includes using carbon or carbon monoxide to control oxide concentration. In one aspect, carbon is the preferred agent to control oxide concentration. The step for removing metal chlorides includes withdrawing metal chloride gas and further includes reducing molten metal chlorides electrolytically and removing the reduced metal so produced.

A further aspect of the invention permits direct reduction of oxide impurities in the salt by electrolysis. In another aspect of the invention, the scrap itself is used as a consumable heating electrode (i.e., disappearing as the scrap melts) for heating the molten salt. An additional aspect of the invention provides that the molten salt is pumped past heating electrodes, which reduces hot spots that otherwise would lead to fuming and cause instability in the molten bath composition. Yet another aspect of the invention permits removal of carbon impurities, which can be introduced to the molten salt when melting of the scrap causes pyrolysis of organic material associated with the scrap, for example, the lacquer coating on beverage cans.

DETAILED DESCRIPTION

The process of the present invention represents a continuous deep salt metal reclamation technique designed and developed primarily for melting high surface area, dirty aluminum scrap. Used beverage cans are an example of such an aluminum scrap, and the process of the present invention is suitably tailored to the high volume of such used beverage cans being recycled today. Aircraft plate and sheet trimmings are examples of aluminum-lithium alloy scrap. However, the process of the present invention is not limited to used beverage cans or aircraft plate and sheet, and also can be applied to most any aluminum or alloy containing oxide impurities including skim or dross formed in melting processes wherein molten aluminum metal or alloy comes into contact with oxygen in the air.

The continuous metal scrap reclamation process of the present invention involves a molten salt maintained continuously in the molten state and providing a chemical composition and oxide composition such that metal recovery is achieved at improved levels continuously.

The process of the present invention operates to control and maintain the chemical and physical composition of the salt continuously at levels consistent with the maximum recovery of aluminum (and alloying agent, e.g., lithium) metal through reaction of the oxides with chlorine and carbon or carbon monoxide to form chlorides of two general types: volatile and non-volatile. The volatile chlorides, e.g., such as titanium tetrachloride and silicon tetrachloride, are removed from the continuous salt-based melting process as part of the reaction sequence in the carbon monoxide/dioxide vapor waste stream. Small amounts of all chlorides present, including aluminum chloride, are removed in the off gas stream, but most remains in the molten salt. Aluminum chloride ($AlCl_3$) in the pure state has a vapor pressure much higher than one atmosphere at aluminum melting temperature. However, $AlCl_3$ forms readily low vapor pressure complexes with most other metal chlorides, i.e., $NaCl \cdot AlCl_3$.

Non-volatile chlorides, e.g., such as aluminum chloride, lithium chloride and magnesium chloride, are removed in a process step by electrolysis. The process provides a continuous melting operation in which recovery of molten aluminum is maximized by controlling the integrity of the salt-based melting medium continuously.

Figure 1:
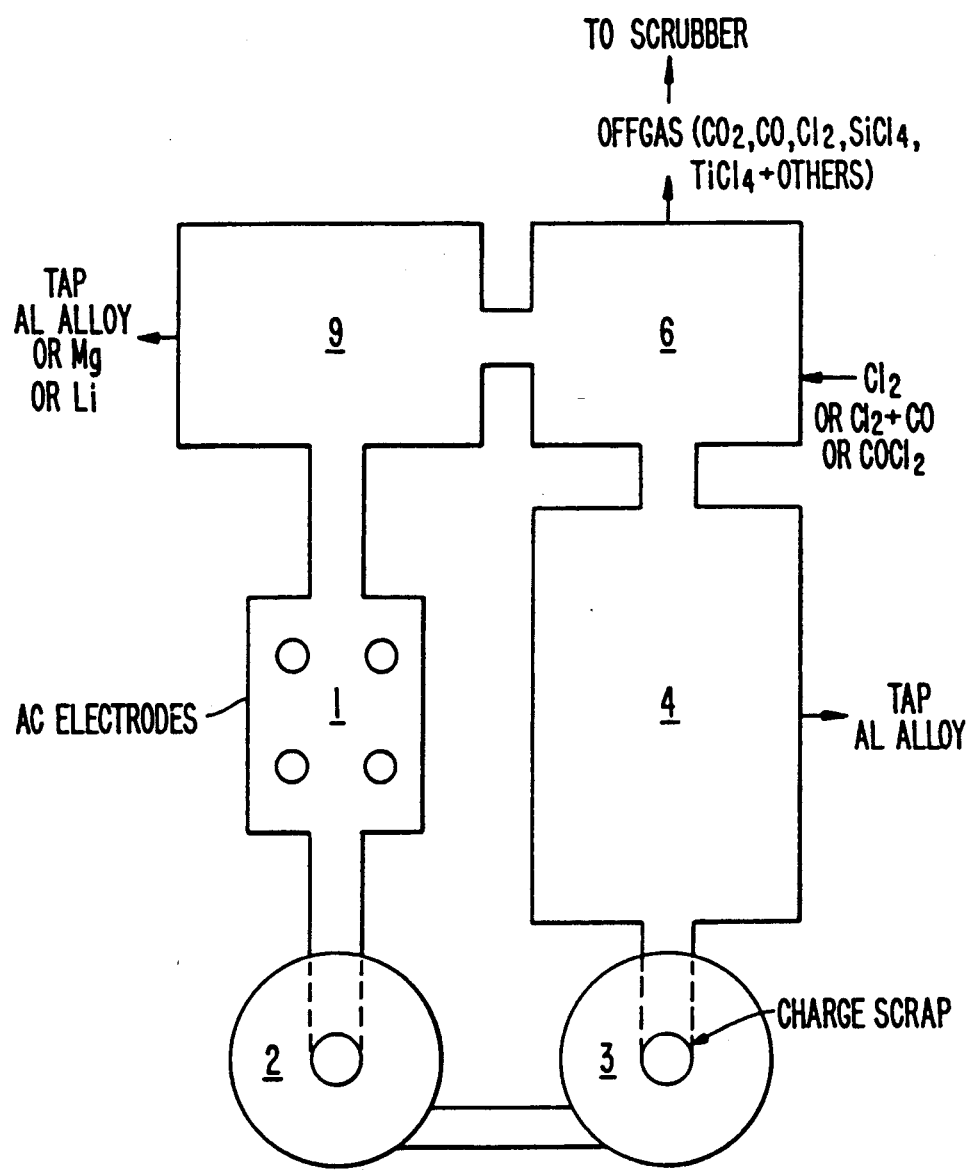
FIG. 1 is a schematic diagram depicting the overall process of the present invention.

Referring now to FIG. 1, a continuous scrap remelt process involves a superheated molten salt (the term superheated means a temperature sufficiently high to accommodate the contemplated metal charge without freezing) melt medium circulated throughout the continuous process of the present invention beginning, for purposes of illustration, in heat bay 1. Salt is heated in heat bay 1 to a temperature to maintain a molten charge in the heat bay, e.g., such as in the range of about 1400°–1450° F. The salt is pumped from heat bay 1 by pump 2 to charge bay 3 where the salt is mixed with aluminum (or alloy) scrap through an appropriate agitation in a swirl motion. In one aspect, scrap enters charge bay 3 continuously via a fume-controlling lock chamber (not shown). As the heated salt mixes with, and melts, the aluminum scrap, coalesced molten metal originating from the scrap collects in a lower portion of a collection bay depicted here as collection bay 4 where an optional coalescer is located to ensure substantially metal-free salt/oxide passage to chlorination bay 6. Chlorine and carbon or carbon monoxide, alternatively phosgene, is introduced to the salt stream in chlorination bay 6 to convert the required amount of oxides into chlorides to maintain a steady-state oxide concentration. In the chlorination bay 6, several gas species are provided such that carbon dioxide is the main reaction by-product as well as titanium tetrachloride and silicon tetrachloride if titanium dioxide or silicon dioxide is present as scrap contaminant which, together with excess chlorine and carbon monoxide, are withdrawn from chlorination bay 6 and passed through a scrubber (not shown). $TiCl_4$/$SiCl_4$ may be recovered before scrubbing by condensation to yield by-product. The molten salt, now enriched with aluminum chloride and magnesium chloride, passes through to electrolysis bay 9 in which the required amount of reduction of aluminum chloride and magnesium chloride (and lithium chloride if present) is controlled to maintain a preferred steady-state salt concentration condition. A relatively small amount of alloy formed in this step can be tapped periodically or, if the formed alloy is a suitable composition, the bay can be connected to the collection bay so reduced metal joins the main pad of molten Al alloy. Cleaned salt passes from electrolysis bay 9 and is fed back into heat bay 1 to be superheated again and maintained at process temperatures of about 1400°–1450° F. The chlorination and electrolysis of chlorides can be replaced by direct reduction of oxides.

The means for heating the salt melt medium in heat bay 1 preferably is AC resistance heating. Heating provided by AC resistance minimizes fume generation and can be carried out under an inert atmosphere. Multiple electrodes can be used in the heat bay to transfer electrical energy to the salt. It should be also noted that the salt bath should be pumped past heating electrodes, with sufficient velocity to reduce and preferably prevent hot spots in the bath which otherwise lead to undesirable increases in fuming and consequent instability in the bath composition.

The process of the present invention takes place within two or more interconnected chambers, as depicted in the Figure. Molten salt flows continuously through the chambers, e.g., as shown in the figure in counterclockwise flow. The flow of salt in the process is induced by a molten salt pump as depicted by pump 2 in the figure. Salt leaving heat bay enters charge bay 3, the next major chamber of the process. In the charge bay, as scrap is added continuously to a swirling or agitated salt, movement of the salt aids in the separation of oxides from the aluminum during melting. Flow rates of the salt into the charge bay 3 are controlled in the process of the present invention to be directly related to the scrap charge flow rate and incoming salt temperature. In this way, the process of the present invention provides a superheated salt (above about 1350° F.) for providing the heat necessary to melt the aluminum scrap.

The salt bath composition is selected on the basis of its ability to promote coalescence of metal, support chlorination and/or electrolysis and maintain a stable, operable composition range. Factors affecting coalescence include viscosity, surface tension and density. Generally, lower viscosities are preferred, along with decreased surface tension to promote wetting of solids (e.g., the oxides) and other liquid phases (e.g., molten aluminum alloy from the scrap). Also, a salt bath having an increased density difference with respect to the metal is preferred to promote separation. Although a salt bath denser than the metal can be used, a less dense salt bath provides a desirable protective cover on the molten metal produced.

The electrolysis kinetics affect the size of the system and therefore the ultimate capital investment required. Increased solubility of the compound being electrolyzed (e.g., $Al_2O_3$) permits use of greater current density and faster electrolysis. Adjustments can be made for low solubility, for example by using increased anode surface area and improving salt circulation via pumping, e.g., gas lift pumping as discussed below, or using a grate cathode where there is a space between the bottom of the grate and the top of the molten metal pad (see U.S. Pat. Nos. 4,219,391 and 4,681,671, disclosures of each incorporated herein by reference).

To maintain the salt bath composition, the salt should have a low propensity to react with magnesium, especially when used beverage can scrap is being processed. Beverage can end alloys generally contain about 4 wt % Mg, with the can body alloy containing about 1 wt % Mg. Reaction of that magnesium can lead to buildup of compounds or complexes such as $KMgF_3$, which interfere with coalescence. Similarly, the salt should not fume too much, since fuming leads to difficulty in maintaining a stable composition. Providing heat to the salt bath by pumping the molten salt past heating electrodes helps to reduce fuming by decreasing hot spots in the bath.

The salt also should be molten in the desired operating range, with lower melting points, e.g., less than 600° C. being preferred. Generally, the operation must be above the melting point of the scrap in order to collect a molten metal pad and separate oxides and other impurities into the molten salt phase. Electrolysis could be carried out below the melting point of the metal, although this generally is not preferred. For used beverage can scrap, the operating temperature will be in the range of about 675° to 750° C., although this will, of course, change depending on the nature of the material being processed. Salts melting between about 200° and 900° C. may be used, with the operating temperature exceeding the salt melting temperature. It should be recognized that salts may melt over a temperature range, in which case some solid material may be tolerated, i.e., the operating temperature may be below the liquidus.

The salt composition may be made up of 75-98 wt % of sodium, potassium, magnesium, aluminum, calcium and lithium chlorides, and about 2 to 25 wt % of fluorides of those metals. Other cations, such as barium, might be used but would suffer practical difficulties due to the expense or hazard involved. It has been found that coalescence seems to improve with increasing fluoride ion content with respect to chloride ion content, reaching a peak at about 10 wt % and decreasing at higher concentrations. Thus, 2-20 wt %, particularly 5-15 wt %, is desirable. The fluoride presence also seems to promote oxide solubility, and thus provides enhanced kinetics for the chlorination reaction or the direct electrolysis of the oxides, permitting the use of a smaller chlorination unit or electrolytic reduction cell. Thus, the fluoride presence is desirable even though somewhat higher temperatures may be required. A useful salt composition includes 10-20 wt % LiF, 10-30 wt % $MgCl_2$ and balance LiCl, particularly 20 wt % LiF, 20 wt % $MgCl_2$ and 60 wt % LiCl. Some of the $MgCl_2$ may be replaced with $MgF_2$. The presence of magnesium compounds in the salt composition counteracts reaction of magnesium metal with the salt. A useful composition for treating aluminum lithium scrap may include 0-25 wt % KCl, 5-15 wt % LiF and 60-90% LiCl, In charge bay 3, oxide films such as $Al_2O_3$ and MgO from the scrap and tramp oxides present in the scrap stream such as $TiO_2$ and $SiO_2$ are wetted by the salt preferentially to form a dilute salt sludge. The aluminum metal droplets sink to the bottom of charge bay 3 and coalesce into a continuous body or pad of molten metal, which is tapped from the chamber continuously or semi-continuously by a number of conventional tapping methods.

Salt flows from the charge bay into the chlorination chamber where sufficient oxides are reacted with chlorine and carbon or carbon monoxide to maintain the concentration of oxides at the desired level. The level of oxides should be maintained at less than about 10 wt %, preferably 5% or less by weight. All the oxides are chlorinated by a reaction of the type:

$$MO(s) + Cl_2(v) + CO(v) \rightarrow MCl(l,v) + CO_2(v)$$

where M can be Al, Mg, Ti, Si, or other metals and acknowledging that the equation must be balanced depending on the particular metal involved.

It has been found that solid carbon used in place of carbon monoxide gas vapor in the process of the present invention and mixed with chlorine provides an unexpectedly advantageous result. In this aspect, excess carbon is added and remains continuously with the salt. It would have been expected that carbon monoxide would react at a higher reaction rate rather than solid carbon. However, it has been found empirically that carbon in the process of the present invention provides a reaction rate about two times faster than when carbon monoxide is substituted in the same process.

It has been found further that the chlorination step of the process of the present invention as depicted in the above equation will not go to any significant rate without the addition of carbon or carbon monoxide. For skim, AlN may be present as well as oxides. Nitrides such as AlN do not require a C or CO reductant for chlorination.

Metal chlorides such as titanium tetrachloride and silicon tetrachloride leave the chlorination chamber in an offgas stream which also contains carbon dioxide, unreacted carbon monoxide, and chlorine gas. Other metal chlorides, such as magnesium chloride, have sufficiently low vapor pressures at temperatures of about 1400° F. and do not leave with waste gas but rather build up in the salt. Aluminum chloride builds up in the salt because it readily forms low vapor pressure complexes with most chlorides, e.g., such as $NaAlCl_4$ or $KAlCl_4$. Aluminum chloride would leave with the waste gases if the complexes were not formed since the atmospheric sublimation point of aluminum chloride is 365° F.

The final chamber through which the salt passes is called the reduction bay wherein the buildup of nonvolatile metal chlorides such as $MgCl_2$ and $AlCl_3$ is controlled. In the reduction bay, a low voltage DC current passes through the salt to form electrolytic products of chlorine gas and reduced metals. The chlorine gas so formed can be recycled to the chlorination reactor of the present process. The metals are formed at the bottom of the chamber, where the formed metal is the cathode, and can be removed periodically as molten aluminum or magnesium or alloys of both, or lithium-aluminum-magnesium alloys.

Incoming scrap containing significant magnesium, e.g., about 2 wt %, sets up a magnesium reaction with the $AlCl_3$ in the charge bay, thereby forming aluminum and $MgCl_2$. In this case, the only metal recovered in the electrolytic cell to any extent is magnesium, since $AlCl_3$ in the continuous process of the present invention will not build up and $MgCl_2$ will increase in concentration in the salt at a higher rate, more so if electrolysis is not continuous. If the electrolysis/reduction is carried out continuously, an Al-Mg alloy is formed. However, a more pure Mg alloy (low Al) is formed as a by-product by allowing the $AlCl_3$ to react through many charge/chlorination cycles before operating a batch electrolysis reduction cell.

Incoming scrap containing significant lithium, e.g., about 2 wt %, reacts with the $AlCl_3$ and $MgCl_2$ in the charge bay, thereby forming aluminum, magnesium, and lithium chloride. Operative chemical reactions are:

$$2AlCl_3 + 3Mg \rightarrow 3MgCl_2 + 2Al$$

$$AlCl_3 + 3Li \rightarrow 3LiCl + Al$$

$$MgCl_2 + 2Li \rightarrow 2LiCl + Mg$$

In this case, the only metal recovered in the electrolytic cell to any extent is lithium, since $AlCl_3$ and $MgCl_2$ in the continuous process of the present invention will not build up and LiCl will increase in concentration in the salt at a higher rate, if electrolysis is not continuous. If the electrolysis/reduction is carried out continuously, an Al-Mg-Li alloy is formed. However, a more pure Li alloy (low Al) and Mg is formed as a by-product by allowing the $AlCl_3$ and $MgCl_2$ to react through many charge/chlorination cycles before operating a bath electrolysis reduction cell.

The preferred method for heating the molten salt-based melt medium of the process of the present invention is electrical resistance AC heating. However, electric radiation or other methods are suitable as substitutes.

The process of the present invention is controlled to minimize any contact with moist air. Otherwise, hydrolysis will occur, leading to chlorine losses. Additionally, fumes from the process would be environmentally undesirable. For these reasons, atmospheric contact is maintained at a minimum.

The process of the present invention provides a chlorination step and an electrolysis step operated continuously. However, such chlorination/electrolysis steps can be performed in a batch or semi-continuous reactor.

In one aspect, the chlorination step can be performed under a high pressure, e.g., above about 50-60 psig. Such a pressure increases reaction rates significantly. However, the process of the present invention is not limited to such higher pressures for practical reasons.

Figure 2:
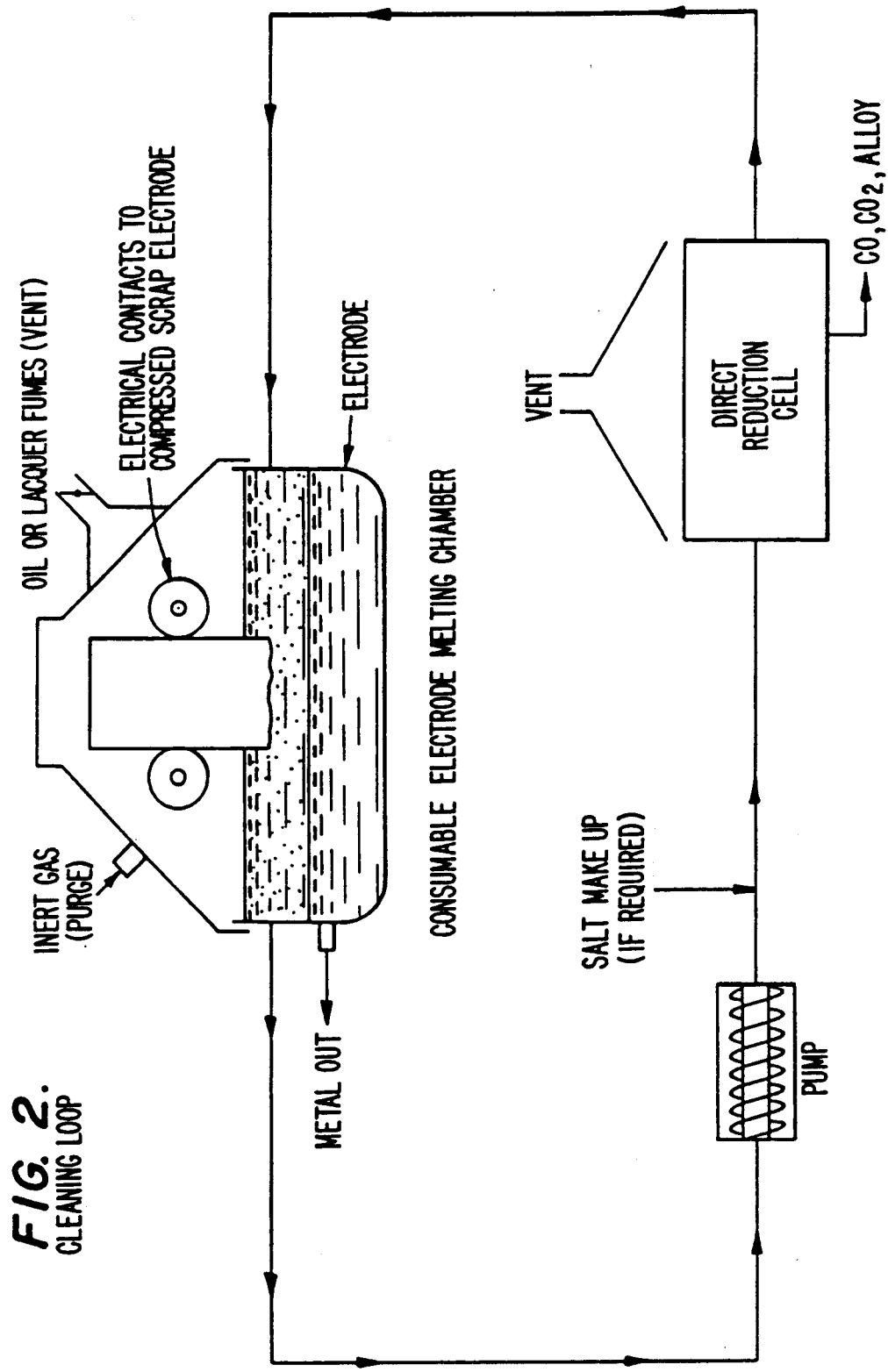
FIGS. 2–4 show an alternative embodiment directed to a different procedure for feeding the scrap to the molten salt.
Figure 3:
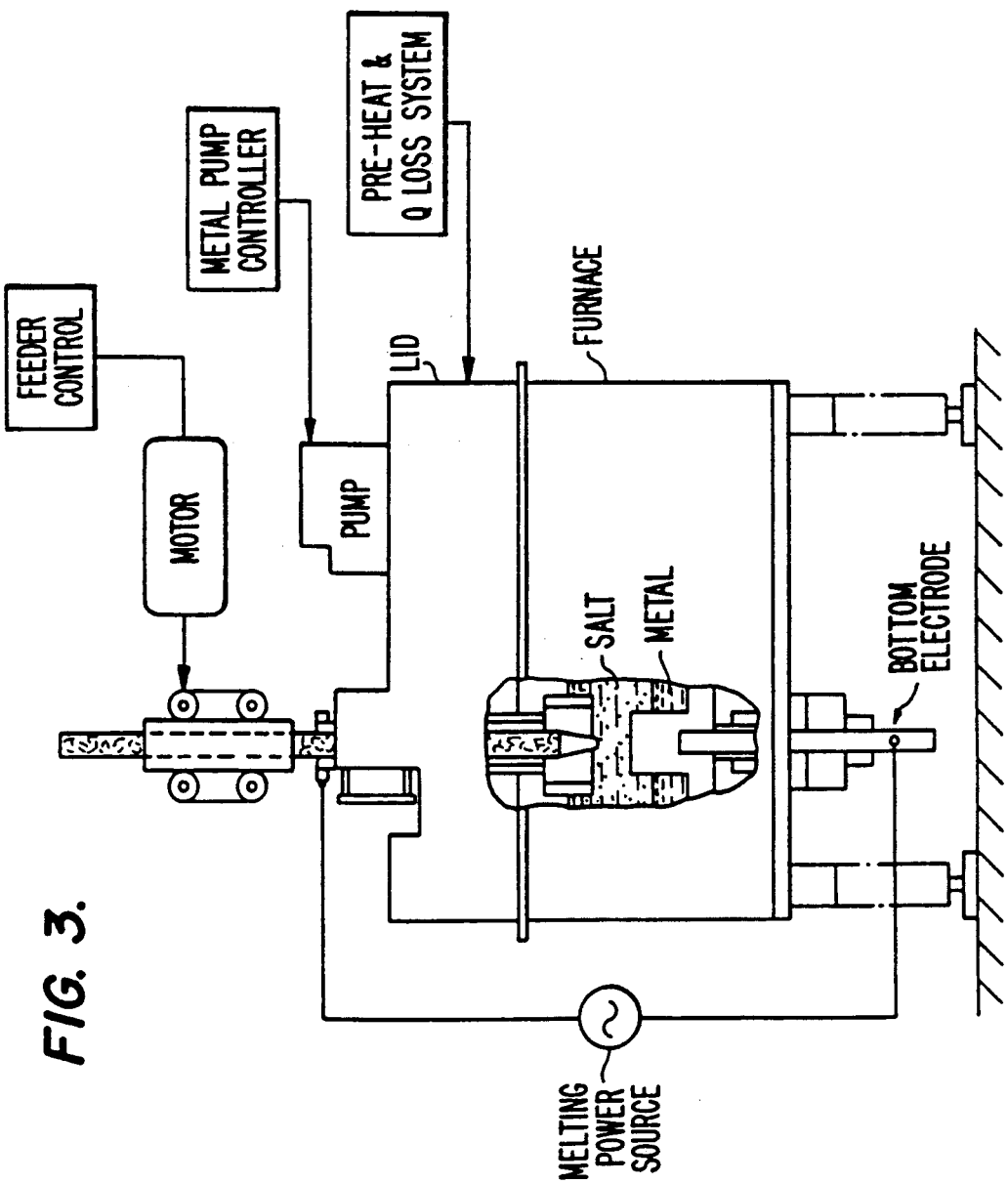
Figure 4:
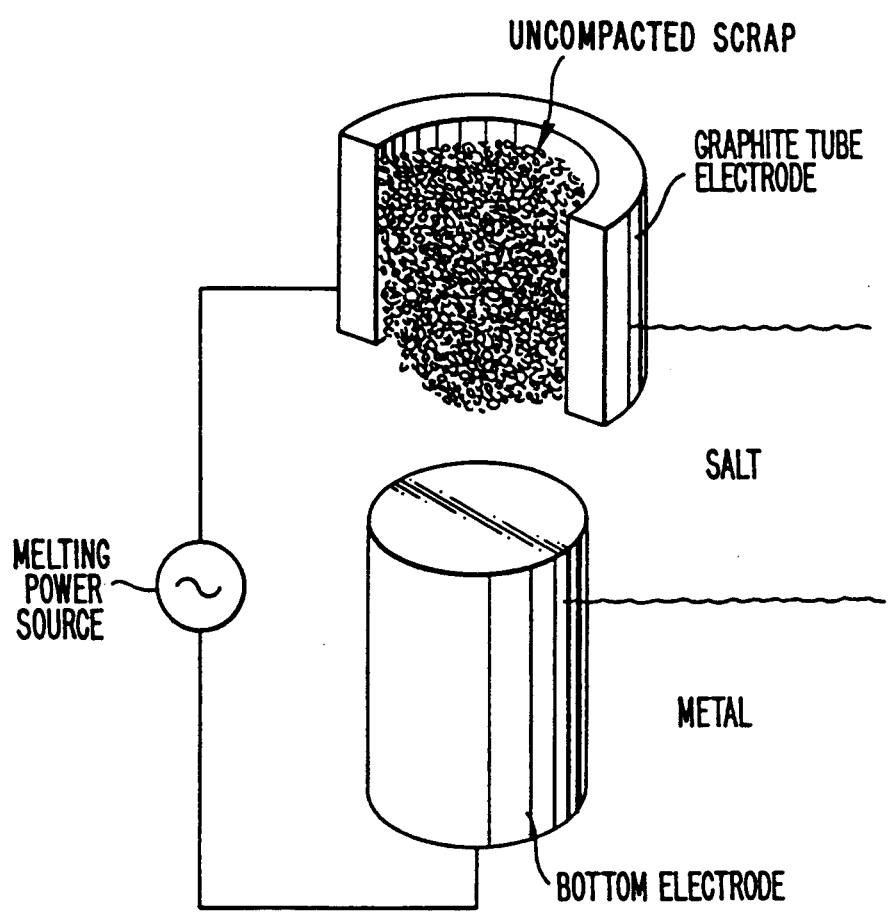

In a further embodiment, the heating and charging bays 1 and 3 can be replaced with a single system in which the scrap being processed serves as a consumable heating electrode for the salt bath. Depending upon heat loss, auxiliary heating electrodes may be provided. Examples of systems are shown in FIGS. 2-4. The term consumable is used to describe the melting away of the electrode. Unlike the term consumable as used with respect to the carbon electrodes of Hall-Heroult cells, the material of the electrode here is not lost but rather is collected in a molten metal pad beneath the molten salt. In the embodiment of FIG. 2, the material to be processed is thus compressed into a bale to form a consumable electrode and fed into the salt bath between electrical contacts, thus becoming itself an electrode. The molten metal pad collected can serve as a counter electrode. This system is especially useful for scrap which is readily baled, or generally provided for recycling in a baled form, such as beverage can scrap. Eliminating the need for debaling of the scrap reduces handling costs and simplifies the process. The melting of the scrap is accomplished by the salt bath, with some assistance from the current passing between the electrode and counter electrode, which current also serves to maintain the salt bath at its desired temperature. Since the salt bath is being continuously pumped past the heating electrode, hot spots within the bath and consequent fuming are reduced, as discussed above. Any lacquer in the scrap is pyrolyzed as the scrap is heated prior to, or at, melting. Lacquer fumes resulting from the melting of beverage can scrap are vented from the chamber. Thus the system provides the further advantage of eliminating the need for a separate delacquering step. It should be noted that the lacquer coating may be pyrolyzed to carbon, which thus would be an additional impurity in the molten salt. This carbon can be removed from the molten salt by pumping oxygen-containing gas, e.g., oxygen or air, into the salt downstream of the scrap addition point.

Referring more specifically to FIG. 3, it can be seen that the system is provided with a feeder motor and control for feeding the baled scrap to the bath at a predetermined rate. The scrap is fed so as to maintain a salt to metal ratio of about 30:1. The scrap passes through electrical contacts before reaching the salt bath. In a preferred aspect, the counter electrode actually extends above the level of the molten metal collected, as shown in FIG. 3. This makes the system's operation independent of the metal level. The metal collected is removed, for example, with a suitable pump. The system is provided with a suitable lid and venting, and also with a heat loss control system (preheat and Q-loss system in FIG. 3), depending on the size of the unit. As unit size increases, insulation alone becomes sufficient to control heat loss. In the further embodiment of FIG. 4, it can be seen that the scrap is fed in an uncompacted form to the salt bath, through the hollow graphite tube electrode. Thus, the system can be adapted to accommodate scrap in either baled or unbaled form. Metal losses as low as 1%, or even lower, can be obtained, as compared to 8% with conventional technology. As noted above, one aspect of the system contemplates cleaning of the salt bath by chlorinating oxide impurities in the bath and then electrolyzing. In general, carbon electrodes can be used for electrolysis of chloride melts, while inert anodes are preferred for melts containing fluorides.

In a further embodiment (FIG. 2), however, the chlorination step can be eliminated, and direct electrolysis of the oxide and even nitride impurities can be conducted in the schematically illustrated direct reduction cell where the evolved CO and $CO_2$ indicate use of carbon electrodes. To achieve this, an electrode is employed which has an extended or substantially increased surface area to be effective for the selective evolution of the desired electrode product, i.e. oxygen or carbon oxides, rather than halogens or halogen compounds resulting from decomposition of the salt bath.

Figure 5:
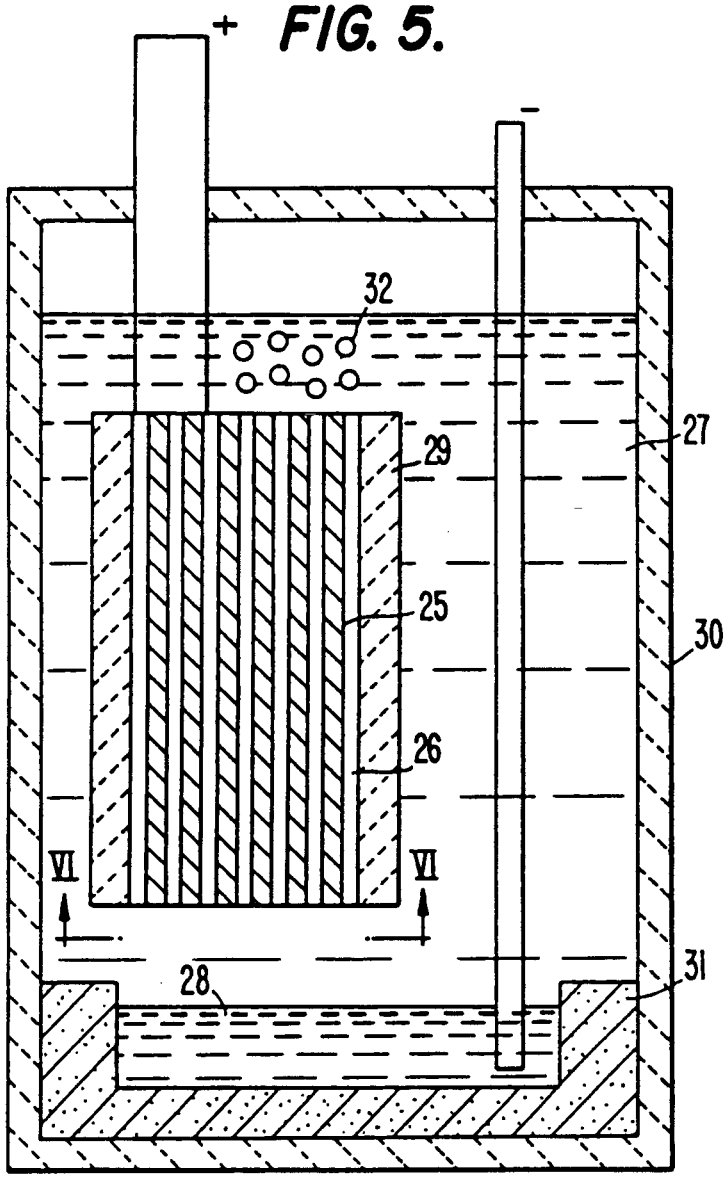
FIGS. 5–7 show a further embodiment permitting direct electrolysis of the oxide impurities in the molten salt.
Figure 6:
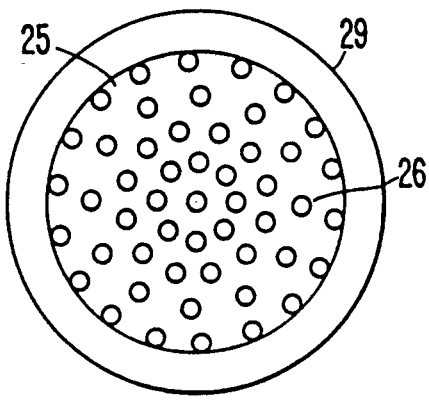
Figure 7:
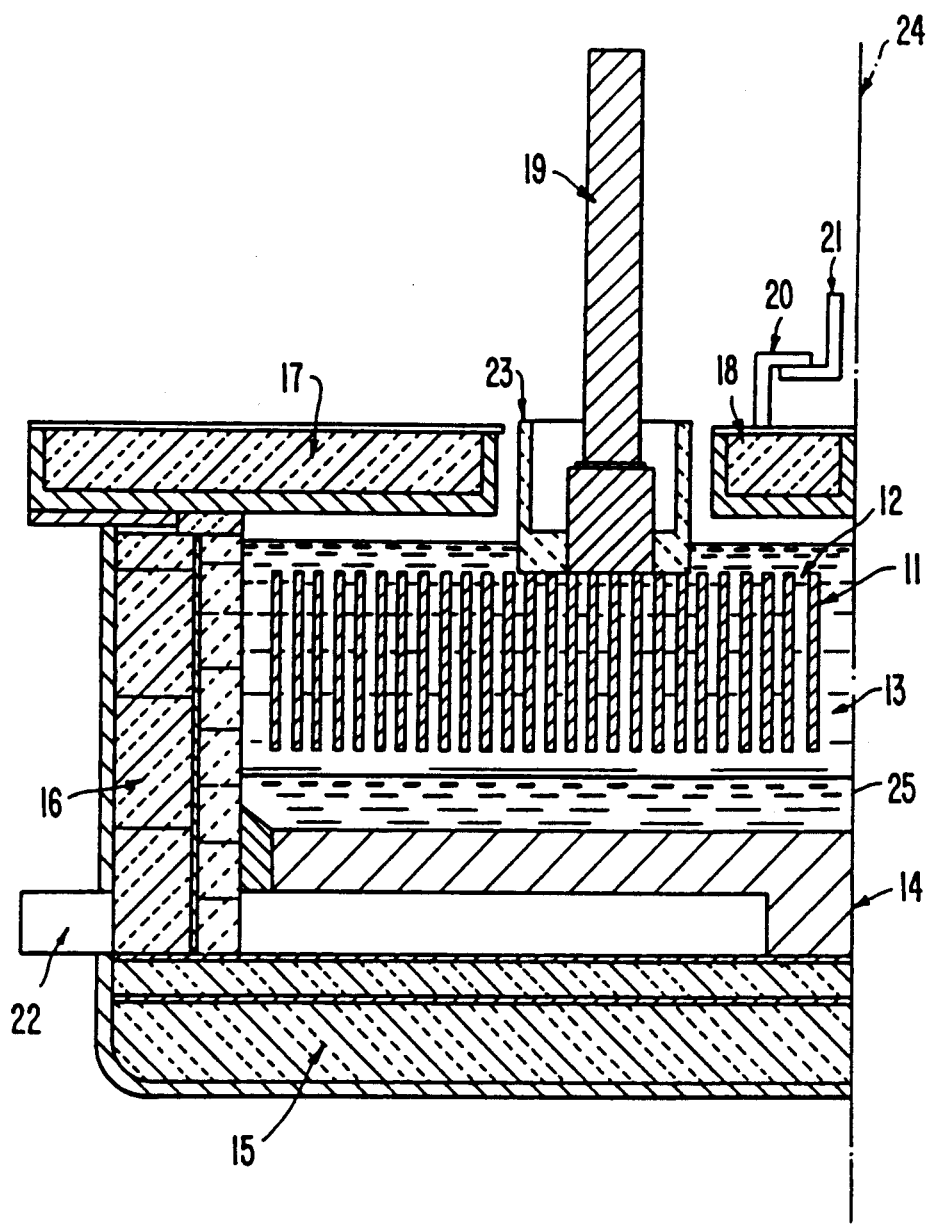

The use of the extended surface area anode, for instance, permits selective electrolysis of a metal oxide at low concentration in a chloride electrolyte. FIGS. 5-7 show a suitable electrode and a system in which it may be used. It can be seen that the electrode is provided with a number of through holes or channels, resulting in a much larger surface area for the electrode. For example, drilling fifty-two ⅜ in. holes through an electrode six inches long increases the surface area by 360 sq. in. If the electrode measures 4.5 in. by 3 in. in cross section, the surface area is practically tripled. Although the surface area increases as hole size decreases, care should be taken that the holes are not made so small that the species of interest cannot gain access to the increased surface area. Thus, the size of the openings should be large enough that gas bubbles do not block the flow of current or provide a path of high resistance. Also, beneficial gas-lift pumping effects can be achieved if the hole size is large enough. This utilizes the gas generated to circulate the molten salt through the holes. See U.S. Pat. No. 3,822,195.

A further advantage provided by the use of the extended area electrode is the extension of available salt bath compositions. Low solubility of the reactant in the electrolyte is not a significant limitation on the bath composition. Thus, baths having low melting temperatures, e.g. 300°-900° C. can be used. Such baths are generally not as corrosive as the baths commonly used in Hall-Heroult cells, and usually have lower densities and alkali metal activities. These factors permit more efficient operation of the electrolytic cell. In the present process, the additional advantage of eliminating the chlorination step is provided.

Referring now to FIGS. 5 and 6 of the drawings, 25 is a cylindrical anode, 26 is one of the channels in the anode, 27 is molten salt, and 28 is a molten metal cathode. The perimeter of the anode, for test purposes, is shielded with a non-conductor 29 to prevent this area from taking part in the electrochemical reaction. The anode is suspended in a quartz vessel 30, and 31 is a graphite liner for the cathode. Gas bubbles 32 are shown rising from the channels 26. Depending on the densities of the molten salt and molten metal, the anode and cathode may be reversed. FIG. 6 shows the end view of the anode illustrating a typical hole pattern drilled into the anode to extend its surface area. A toroidally shaped circulation pattern is set up in the molten salt due to the gas-lift action of the bubbles 32 rising in the channels 26, with the salt rising in the channels and then falling down the outer sides of non-conductor 29, thence to sweep across the upper surface of the cathode 28, and again up through the channels. This circulation acts to suspend undissolved oxide particles and to incorporate into the molten salt the replenishment oxide particles, which enter with molten salt incoming from the pump in FIG. 2.

FIG. 7 shows the half of a production cell left of centerline 24, where 11 is an anode, 12 is one of the channels in the anode, 13 is the molten salt bath, and 14 is a carbonaceous, electrically conductive floor. Molten metal (e.g., aluminum) cathode 25 rests on floor 14. Insulation is provided by bottom lining 15, sidewall 16 and lid 17,18. Rod 19 is an anode collector bar for providing d.c. electrical current to the anode 11. The cell lid is attached to a superstructure 21 via elbow 20 and rests on the sidewall 16. Current is removed from the cell through cathode collector bar 22. Sleeve 23 protects the connection between the anode collector bar and the anode from molten salt. A larger anode can be employed, because there is no frozen electrolyte to interfere with its positioning. Depending on the relative densities of the molten salt and molten metal, the anode and cathode may be reversed. The circulation pattern executed by the molten salt in the cell of FIG. 7 will be influenced both by the gas-lift action of the evolved anode product and by electromagnetic phenomena, and the resulting circulation pattern executed by the molten salt will be the result of those combined effects. Electromagnetic effects become more important in production cells because of their large size (e.g., 15-foot by 40-foot rectangular dimensions in the horizontal plane) and the larger electrical current passing through them (e.g. 125to 150 kiloamperes). For further information on circulation patterns caused by electromagnetic effects, see Walter E. Wahnsiedler's "Hydrodynamic Modeling of Commercial Hall-Heroult Cells" appearing in "Light Metals 1987", pp. 269+. The circulation will again act to keep undissolved oxide particles in suspension. Points of addition of replenishment oxide in molten salt coming from the pump in FIG. 2 may be chosen based on the molten salt circulation pattern in a cell to effect an optimum, rapid incorporation of fed oxide into the cell.

While the invention has been described in terms of preferred embodiments, the claims appended hereto are intended to encompass all embodiments which fall within the spirit of the invention.

What is claimed is:

1. A process comprising:
   melting light metal scrap and/or skim in molten salt, whereby the molten salt accumulates metal oxide impurities; and
   subjecting the molten salt to electrolysis to electrolyze the metal oxide impurities directly and remove the metal oxide impurities from the salt.

2. The process of claim 1, wherein the light metal is aluminum or an aluminum-lithium alloy, the process further comprising coalescing molten aluminum from the molten salt.

3. The process of claim 2, wherein the light metal is an aluminum-lithium alloy, the process further comprising recovering metal comprising lithium form said electrolysis step.

4. The process of claim 1, wherein the molten salt comprises about 75-98 wt % of a chloride salt and about 2-25 wt % of a fluoride salt.

5. The process of claim 4, wherein the chloride and fluoride salts are Na, K, Mg, Al, Ca, or Li salts.

6. A process for treating light metal scrap and/or skim, comprising:
   melting the scrap and/or skim in a molten salt bath; and
   heating the molten salt by pumping it past a heating electrode to reduce hot spots in the molten salt which would lead to fuming from the molten salt.

7. A process for treating light metal scrap and/or skim, comprising:
   melting the light metal scrap and/or skim in molten salt;
   the light metal scrap and/or skim being fed to the molten salt as a consumable heating electrode for heating the molten salt.

8. The process of claim 7, wherein the molten salt is pumped past the consumable heating electrode to reduce hot spots which would lead to fuming from the molten salt.

9. The process of claim 7, wherein the light metal scrap and/or skim is fed in the form of a compacted mass.

10. The process of claim 7, wherein the light metal scrap and/or skim is fed in an uncompacted form through a tube electrode.

11. The process of claim 7, further comprising coalescing light metal from the molten salt as a pad of molten metal and providing an electrode counter to the scrap heating electrode which protrudes above the level of the molten metal pad to make the heat balance of the process independent of the level of the molten pad.

12. A process for treating light metal scrap and/or skim, comprising:

melting the light metal scrap and/or skim in molten salt;

collecting in the molten salt impurities including oxides and carbon from the light metal scrap and/or skim; and introducing oxygen-containing gas into the molten salt to remove carbon from the molten salt.

13. The process of claim 12, further comprising subjecting the molten salt to electrolysis to remove oxide impurities from the molten salt.

14. The process of claim 13, wherein the oxides impurities are subjected to chlorination prior to removal by electrolysis.

15. The process of claim 12, wherein the carbon results from pyrolysis of an organic coating on light metal scrap.

16. The process of claim 15, wherein the organic coating is a lacquer.

17. The process of claim 16, wherein the light metal scrap and/or skim comprises beverage cans provided with said lacquer coating.

* * * * *

UNITED STATES PATENT AND TRADEMARK OFFICE
CERTIFICATE OF CORRECTION

PATENT NO. : 5,057,194

DATED : October 15, 1991

INVENTOR(S) : Donald L. Stewart et al.

It is certified that error appears in the above-identified patent and that said Letters Patent is hereby corrected as shown below:

| | |
|---|---|
| Col. 1, line 10 | Change "Ser. No. 139,391" to --Ser. No. 138,391--. |
| Col. 1, line 12 | Delete "su" from end of line. |
| Col. 3, line 41 | Change "NaCl AlCl$_3$" to --NaCl·AlCl$_3$--. |
| Col. 4, line 46 | After "bay" insert --1--. |
| Col. 5, line 66 | Change "MgCll$_2$" to --MgCl$_2$--. |
| Col. 7, line 22 | Change "2AlCl$_3$+3Mg--3MgCl$_2$+2Al" to --2AlCl$_3$+3Mg--3MgCl$_2$+2Al--. |
| Claim 3, line 44 Col. 10 | Change "form" to --from--. |

Signed and Sealed this

Sixteenth Day of March, 1993

Attest:

STEPHEN G. KUNIN

Attesting Officer

Acting Commissioner of Patents and Trademarks